United States Patent Office 3,606,694
Patented Sept. 21, 1971

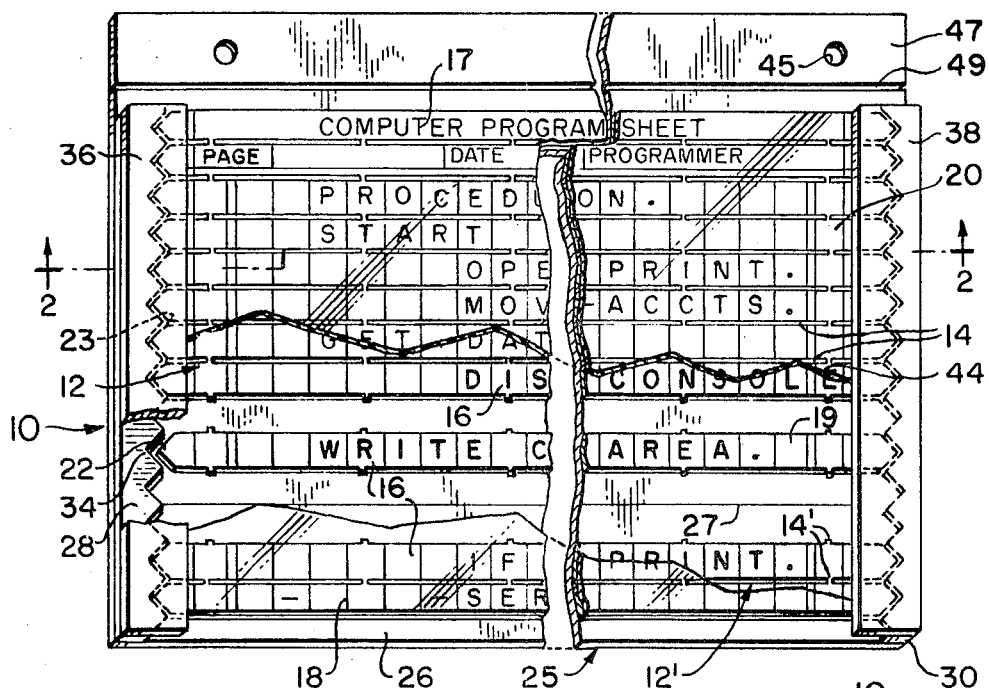
FIG. 1
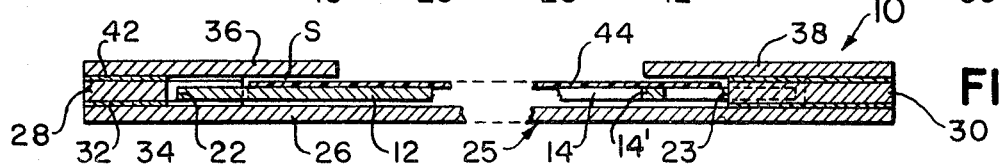
FIG. 2
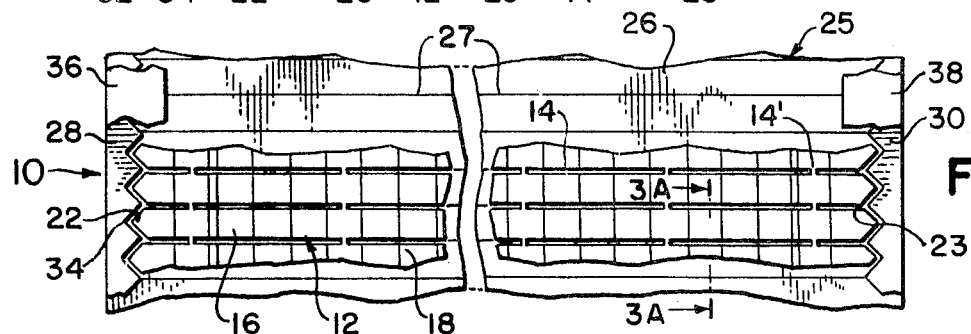
FIG. 3
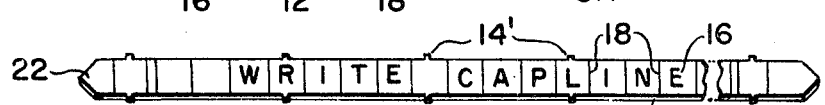
FIG. 4
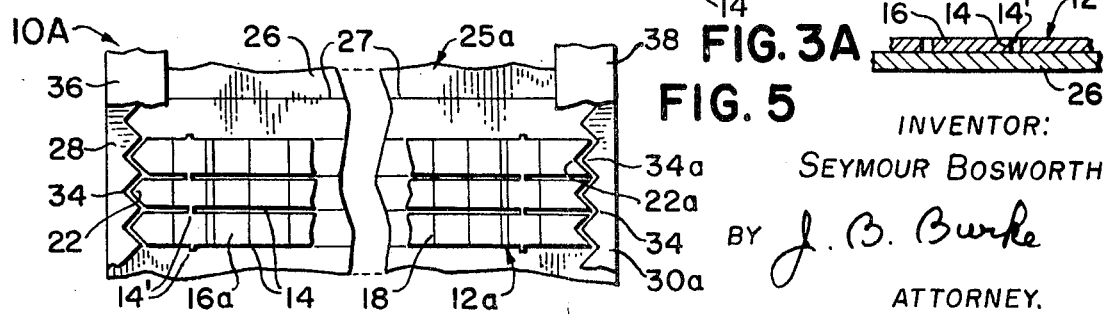
FIG. 3A
FIG. 5
INVENTOR:
SEYMOUR BOSWORTH
BY J. B. Burke
ATTORNEY.

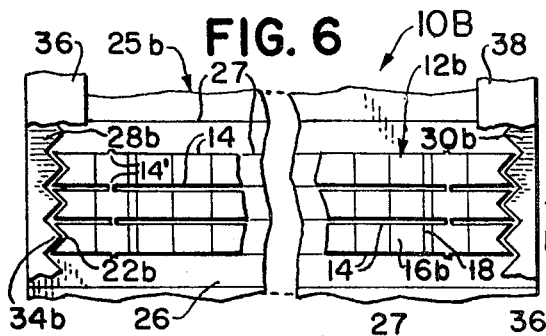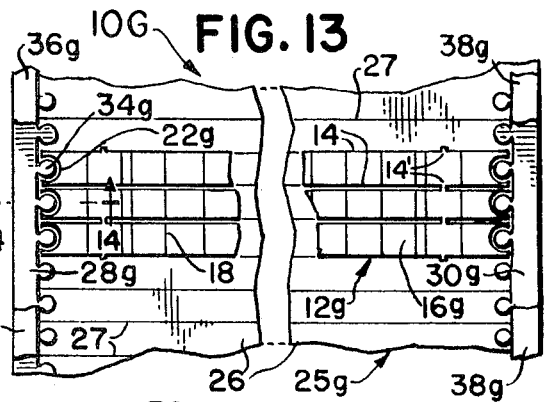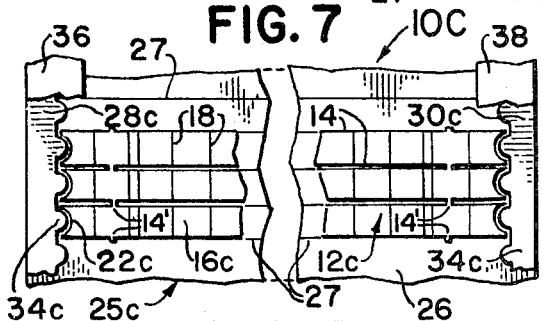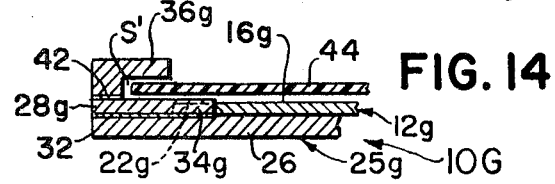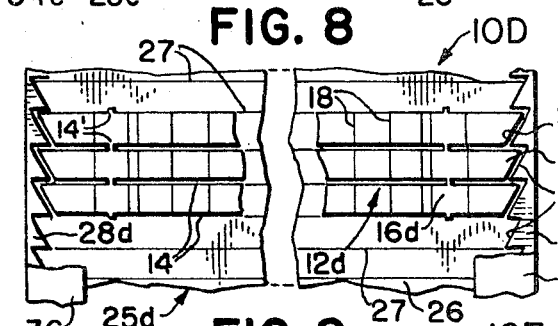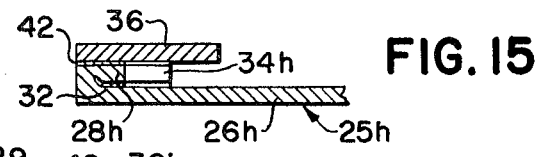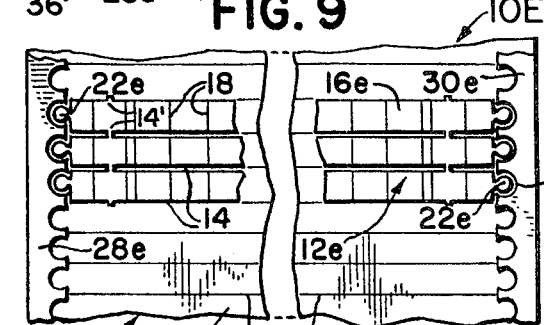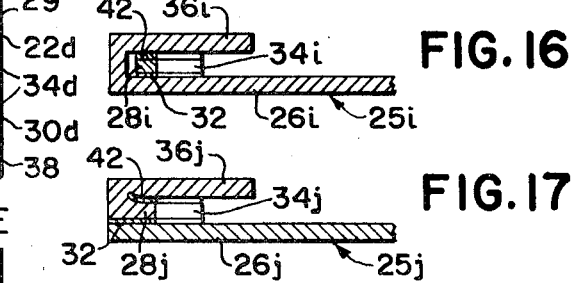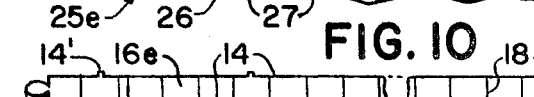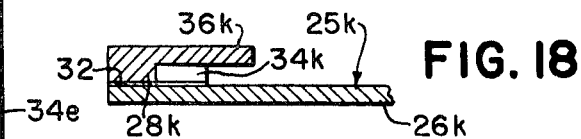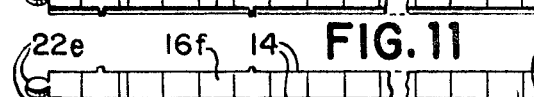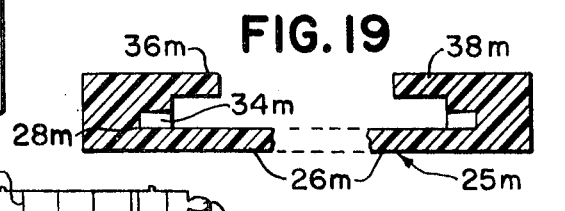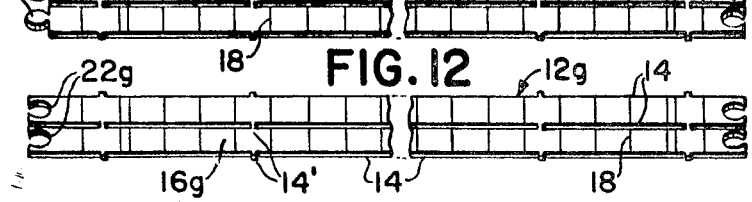

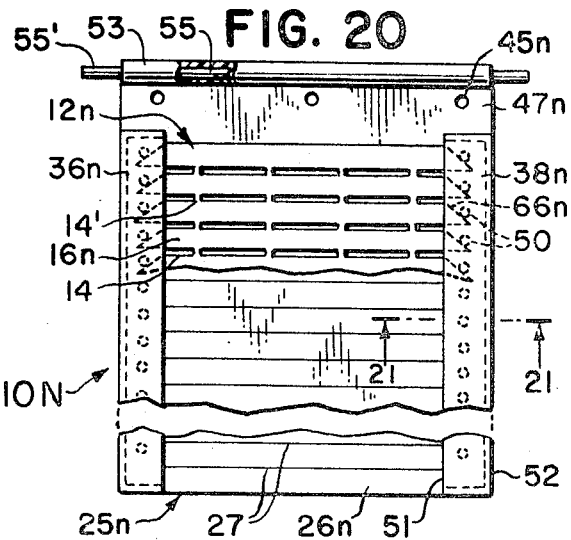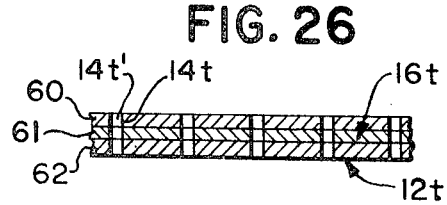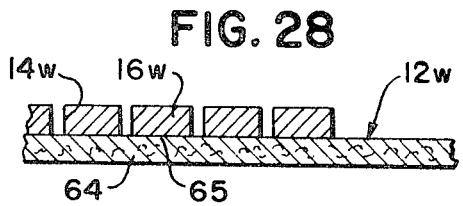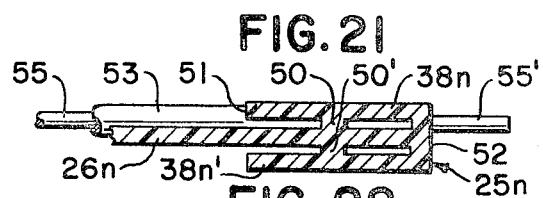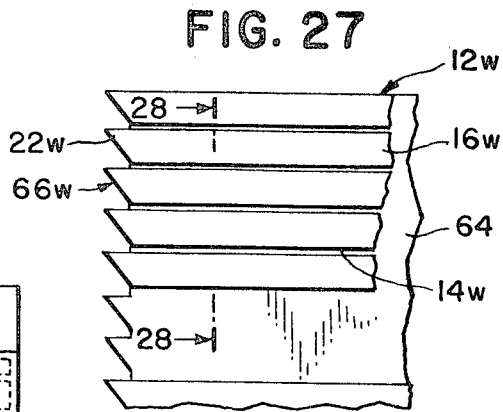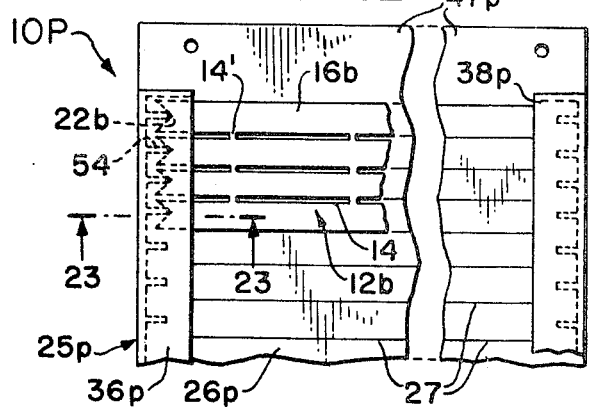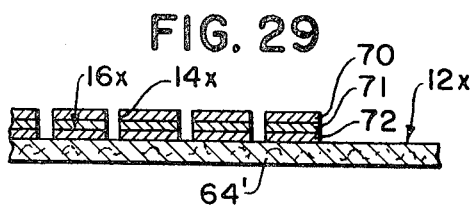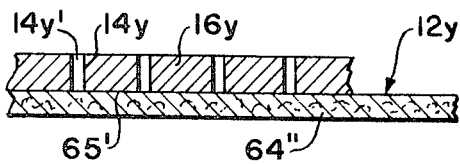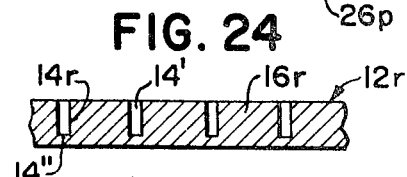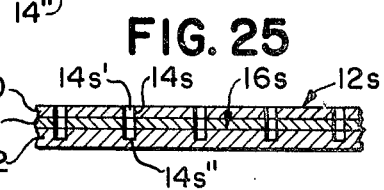

3,606,694
DEVICE FOR AIDING PREPARATION OF LISTS
Seymour Bosworth, 9 Forest Drive,
Plainview, N.Y. 11803
Filed June 27, 1968, Ser. No. 740,726
Int. Cl. G09f 9/00
U.S. Cl. 40—63                4 Claims

ABSTRACT OF THE DISCLOSURE

A device for aiding preparation of lists such as computer programs, directories, registers and the like in the form of a sheet separable along scored, parallel, transverse lines into a multiplicity of narrow strips. A flat, rectangular frame holder is provided for holding a complete sheet or a sheet divided into any number of parts or individual strips. Opposite ends of each strip are shaped to detachably engage with correspondingly shaped lateral marginal side pieces or portions of the holder. The holder is reusable any desired number of times for different replacement sheets.

---

The invention concerns a device useful in preparing lists comprising an individual form sheet separable into strips, and a frame holder especially constructed for holding a complete form sheet or a number of strips produced by separating a form sheet into strips and then arranging them to define a complete form.

The invention will be explained with particular reference to a computer programming aid, but it should be understood that this is only exemplary and that the device has other uses and applications in preparing lists of various types.

Heretofore electronic computer programs have been set up by filling in preprinted program forms with appropriate symbols in a multiplicity of adjacent lines extending vertically and horizontally across the forms. Due to the complexity of almost all computer programs it is virtually impossible to fill in program forms without the need for subsequent changes. These changes may include additions, deletions, alterations and rearrangements. Changes may be necessary during the initial writing of the program, during subsequent debugging phases, or even after the program has been successfully run if program requirements become altered.

To effect such changes the programmer has heretofore had to rewrite entire program forms. Since a complete program may contain hundreds of complete forms, and since each form may contain a thousand characters or more, the task has been very laborious and time consuming. Even where it has been possible to erase a small section of a program form and to write over the erased section, this too was very time consuming. When instructions were not written in proper order on the program forms, even if they were numbered to indicate their proper sequence, the programmer's comprehension of the program was often seriously impaired with consequent loss of time, and decrease in working efficiency. To correct such a situation the entire program sheet had to be rewritten which as above mentioned was objectionable.

The present invention is directed at overcoming the above and other difficulties and disadvantages encountered by programmers in using conventional computer program forms, by providing a new device which serves as an efficient, versatile, time and labor saving programming aid.

According to the present invention, the programmer writes his instructions line-by-line on specially constructed program form sheets which are preprinted with columnar rulings, headings and other standardized requirements of the particular computer language to be used. When he finishes making entries on one of the new sheets he inserts the completed sheet into a frame holder specially constructed to support the program sheet. Alternatively he can make his entries on the program sheet while it is held in the frame holder. At any time the programmer can add, delete, alter or rearrange instructions by separating a program sheet along prescored lines and detaching one or more strips on which instructions or entries are to be changed. The programmer can then mark the proper instructions or entries on other blank strips and can insert them into the holder in correct sequence with respect to the remainder of the program sheet. If the order of instructions or entries appearing on different strips is to be changed, the programmer proceeds as before mentioned. He detaches appropriate strips, arranges them in a new, proper sequence and secures them in the holder in the new sequence. No rewriting of instructions or entries is necessary for such a program rearrangement.

By the present invention one or more new lines can be inserted in a complex computer program in less than a minute without changing or disturbing instructions or entries already written. There is no possibility of introducing new errors in previous correct instructions or entries appearing elsewhere on a program sheet, since the instructions on correct strips need never be rewritten. The material saving of time and labor in such program adjustments and changes made by use of the present invention can be appreciated when it is realized that mere rewriting one or more pages of a program by a skilled programmer may take twenty or more minutes per page. Also important is the elimination of errors heretofore introduced during recopying of prior correctly written instructions or entries.

Other objects and advantages of the invention will become apparent from the following detailed description taken together with the drawings, wherein:

FIG. 1 is an oblique plan view of a device embodying the invention in the form of a programming aid including an assembly of a new program sheet and a new holder according to the invention, parts being broken away to show internal construction.

FIG. 2 is a cross sectional view on an enlarged scale taken on line 2—2 of FIG. 1, parts being broken away.

FIG. 3 is a plan view of a part of the assembly of FIG. 1, portions being broken away.

FIG. 3A is a fragmentary enlarged sectional view taken on line 3A–3A of FIG. 3.

FIG. 4 is an oblique plan view of an individual strip of a program sheet.

FIG. 5 and FIGS. 6, 7, 8 and 9 are fragmentary horizontal plan views similar to FIG. 3, showing other programming aids of different construction.

FIG. 10 is an oblique plan view similar to FIG. 4, but showing an interlocking type of strip such as may be taken from the program form sheet shown in FIG. 9.

FIGS. 11 and 12 are oblique plan views of two other interlocking types of strips, each figure showing a pair of attached strips.

FIG. 13 is a plan view of a programming aid assembly including a program sheet with interlocking strips as shown in FIG. 12, parts of the assembly being broken away.

FIG. 14 is an enlarged fragmentary sectional view taken on line 14—14 of FIG. 13.

FIGS. 15, 16, 17, 18 and 19 are fragmentary sectional views similar to parts of FIGS. 2 and 14, and each illustrating a different construction for a holder of a program sheet.

FIG. 20 is a plan view with parts broken away of another device embodying the invention.

FIG. 21 is an enlarged fragmentary sectional view taken on line 21—21 of FIG. 20.

FIG. 22 is a plan view of part of a further device embodying the invention.

FIG. 23 is an enlarged fragmentary sectional view taken on line 23—23 of FIG. 22.

FIGS. 24, 25 and 26 are enlarged fragmentary sectional views similar to a part of FIG. 3A, showing other program sheets.

FIG. 27 is a plan view of part of still another program sheet.

FIG. 28 is an enlarged fragmentary sectional view taken on line 28—28 of FIG. 27.

FIGS. 29 and 30 are enlarged fragmentary sectional views similar to FIG. 28, of further program sheets.

Referring first to FIGS. 1, 2, 3 and 3A, there is shown an assembly 10 of a programming aid including a preprinted, rectangular program sheet 12 made of paper, cardboard, laminated fiber or wood, sheet plastic or any other flexible sheet material capable of being written upon by pencil, pen, typewriter, crayon, or other marking medium. The sheet 12 has scored lines or slits 14 extending transversely across the sheet in closely spaced parallel disposition to define a multiplicity of narrow strips 16. Discontinuities or webs 14' shown in FIGS. 1–3 are provided along the slits to hold the strips to each other. By the arrangement described the sheet 12 is separable into any one or more parts or strips along lines or slits 14 by severing or tearing the webs 14' without the need for scissors, knife or other cutting tool.

On the strips may be preprinted headings 17 and spaced vertical lines 18 defining boxes 19 in which appropriate coded symbols, characters or numerals 20 can be written.

Opposite ends of each strip 16 are formed with angular points 22 defined by notches 23 along both lateral edges of sheet 12, for detachable engagement in a sheet holder 25. By this arrangement the sheet 12 is held in place. Separate parts 12' of the sheet and even individual strips 16 are held in place in proper horizontal alignment transversely across the holder 25.

Holder 25 is a reusable frame which can be made of cardboard, laminated fiber, plastic, aluminum or any other suitable rigid or flexible material. This holder has a flat rectangular back piece or board 26. Two side pieces 28, 30 overlay lateral marginal edges of the back board and extend longitudinally along these edges. These side pieces can be secured by a suitable glue or adhesive 32. The side pieces have notches 34 extending along inner opposing edges longitudinally of the holder to receive points 22 of sheet 12 and the individual strips 16. Overlaying side pieces 28, 30 are further flat side pieces 36, 38 which are wider than pieces 28, 30 so that free inner marginal portions extends laterally inward to define spaces S underneath in which fit lateral edges of sheet 12 as well as pointed end of the individual strips 16. Pieces 36, 38 are secured in place on pieces 28, 30 by suitable glue or adhesive 42. The side pieces 28, 30, 36 and 38 can be made of the same material as back board 26 or can be of different materials. Instead of glue or adhesive, the side pieces can be cemented, welded, stapled, heat-sealed or otherwise joined together. They can also be integrally molded together to form a unitary structure. Guide lines 27 are preprinted on the back board to indicate where strips 16 are to be placed for proper engagement in notches 34.

After a completed program sheet is inserted into holder 25, by flexing the sheet so that its lateral side edges fit under the side pieces 28, 30, and then flattening the program sheet, a thin flexible sheet 44 of clear acetate or other transparent material can be fitted between the side pieces 28, 30 with its margins engaged under inner portions of side pieces 36, 38 in spaces S. The assembly can then be used directly. Alternatively the completed sheet in the holder can be reproduced by xerography, photography, or other reproduction process, for use in key punching, tape preparation, etc. The original assembly 10 of program sheet and holder can be stored for reference and future use. Back piece 26 has a top marginal extension 47 provided with a plurality of holes 45 for mounting a plurality of assemblies 10 in a conventional ring binder or flexible fastener binder.

The marginal extension 47 may have a crease or score line 49 to permit the holder to be bent at the score line when in the binder, or the marginal extension can be flexible. The marginal extension with holes 45 can be located at either lateral edge or at the bottom edge of the holder instead of at the top. If the holder is to be mounted in a free standing rack of conventional type, marginal extensions 47n can be formed with a tubular edge 53 to receive a rod 55 having free ends 55' for insertion into appropriate slots or holes in the rack.

FIG. 4 shows clearly the points 22 at opposite ends of a narrow strip 16 as removed from a sheet 12. FIG. 5 shows a way of keying strips 16a so that they cannot be accidentally turned around when being fitted into holder 25a of assembly 10A without obstructing a guide line 27 and making the error obvious. Each strip 16a of sheet 12a has a point 22 at one end and a notch 22a at the other end. Points 22 engage in notches 34 of side piece 28, while notches 22a of each strip 16a receive correspondingly shaped points 34a formed along the inner marginal edge of side piece 30a. Side pieces 36, 38 and back board 26 have the same structure as in holder 25 of FIGS. 1–3.

In assembly 10B of FIG. 6, notches 22b are formed at opposite ends of each strip 16b of sheet 12b. These notches receive points 34b formed along inner opposing marginal edges of both side pieces 28b and 30b of sheet holder 25b. Side pieces 36 and 38 overlay side pieces 28b, 30b as in assemblies 10 and 10A.

In assembly 10C of FIG. 7, side pieces 28c and 30c of sheet holder 25c have arcuate or semicircular projections 34c formed along inner opposing edges on back board 26. Opposite ends of the separable strips 16c of sheet 12c are formed with arcuate or semicircular notches 22c to receive the projections 34c. Side pieces 36 and 38 overlay the side pieces 28c, 30c.

In assembly 10D of FIG. 8, opposite lateral edges of sheet 12d are serrated to define points 22d at opposite ends of separable strips 16d. The points 22d are nonsymmetrical with respect to longitudinal, central lines of the strips. The points 22d are defined by single straight lines 29 angularly disposed to opposite edges of the strips. The side pieces 28d and 30d of holder 25d have correspondingly shaped nonsymmetrical notches 34d formed along inner opposing edges. Side pieces 36 and 38 overlay side pieces 28d. Other parts corresponding to parts of assembly 10 are identically numbered.

In assembly 10E of FIG. 9, side pieces 28e and 30e of holder 25e are formed with dovetailed notches 34e. These notches receive correspondingly shaped dovetailed points or keys 22e formed at opposite ends of the separable strips 16e of sheet 12e. When such interlocking points and notches are employed, then the overlying side pieces 36 and 38 of assembly 10 can be omitted, if protective transparent sheet 44 shown in FIGS. 1, 2 and 3 is not required.

FIG. 10 shows individual strip 16e as separated from sheet 12e of FIG. 9. This strip has dovetailed rounded keys 22e at opposite ends.

FIG. 11 shows part of another sheet 12f in which each strip 16f has a rounded key 22e at one end while the other end is formed with dovetailed keyway or notch 22f. The holder (not shown) for this sheet will have side pieces with correspondingly shaped dovetailed notches and keys to detachably secure sheet 12f therein. This arrangement has the advantage that individual strips cannot be accidentally turned around and fitted into the holder, and at the same time the keys and keyways provide more secure engagement of the strips in the holder.

FIG. 12 shows further strips 16g formed with dovetailed notches 22g at opposite ends. Each strip is a separable part of sheet 12g, part of which is shown in FIG. 12. FIGS. 13 and 14 show sheet 12g engaged in side pieces 28g, 30g on holder 25g of assembly 10G. Narrow side pieces 36g and 38g terminate at dovetail keys 34g of side pieces 28g, 30g which engages notches 22g. The side pieces 36g, 38g do not overlay keys 34g so as not to interfere with engagement of notches 22g with keys 34g. Spaces S' under the narrow side pieces 36g and 38g allow room for insertion and retention of transparent protective sheet 44. If transparent sheet 44 is not to be used then upper side pieces 36g and 38g can be omitted. If desired, narrow side pieces 36g and 38g can be provided for holder 10E, if a transparent sheet 44 is to be mounted over sheet 12e. These narrow side pieces will not cover the keys and notches so as to avoid interfering with engagement and removal of strips 16g.

FIG. 15 shows an alternate construction for a sheet holder 25h. This sheet holder has base board 26h integral with each marginal side piece. Only one side piece 28h is shown. This side piece is folded over the base board and is secured by glue or cement 32. The other coplanar side piece will be similarly constructed and secured. A side piece 36 is secured by glue or cement 42 over side piece 28h. A similar side piece will be provided at the other marginal edge of the holder. Instead of glue or cement, staples or other fastening means can be used.

FIG. 16 shows sheet holder 25i formed with integral back board 26i and notched side piece 34i. Side piece 28i is interposed between the side piece 36i and back board 26i and is secured in place by glue or cement 32 and 42 or other fastening means.

FIG. 17 shows sheet holder 25j in which upper wider side piece 36j is integrally formed with narrower notched side piece 28j and secured by cement 42. Side piece 28j underlays the upper side piece. Back board 26j underlays the overlapped side pieces which are secured by cement 32 to the back board. Other fastening means than cement 32 and 42 can be used.

FIG. 18 shows sheet holder 25k with upper and wider side piece 36k integrally molded or formed with lower and narrower notched side piece 28k. The underside of the molded side piece is secured by adhesive, or cement 32 or other fastening means to backboard 26k. Notches 34k are molded into the inner edge of side piece 28k.

Sheet holder 25m is shown in FIG. 19. This sheet holder has base board 26m, lower side piece 28m and upper side piece 26m all integrally molded together as a single unit. Notches 34m are integrally molded in the inner edge of side piece 36m.

Although only a single left marginal edge of each sheet holder is shown in FIGS. 15-19, it will be understood that the right marginal edge of the holder will be similarly formed, and the notches in the inner opposite edges of the side pieces will be formed as shown in any of FIGS. 1, 5-8 and 13.

The sheet holders of FIGS. 15, 16 and 17 can be formed by folding over and securing the side pieces to each other or to the back board. Glue, cement, staples, heat sealing or other fastening means can be used. It will be noted that in all the sheet holders shown and described, parts of a sheet or individual strips cannot become displaced in the plane of the sheet and notched side pieces by slipping or turning on the back board. The strips are all engaged at opposite ends in notches or projecting points or keys or keyways. All of the separable strips have individually shaped opposite ends arranged to interfit or interlock with correspondingly shaped mating portions of the side pieces of the sheet holder. All the sheets described have the capability of rapid change of any strip, or part of a sheet or full sheet as required for addition, deletion, alteration or arrangement of instructions, entries, indicia or other data.

In assembly 10N of FIGS. 20 and 21 is shown another sheet holder 25n made of a plastic sheet material. Marginal side pieces 36n and 38n may be formed by folding over marginal edges of back piece 26n, or they may be separate pieces. The side pieces are secured in position by heat-sealed border seams, and by dots or spots 50 spaced apart lengthwise of the holder and located between inner and outer edges 51, 52 of the side pieces 36n and 38n. Only part of sheet 12n provided with scored lines or slits 14 to define strips 16n is shown in FIG. 20. The dots 50 define spaced abutments between which pointed ends of strips 16n are engaged under side pieces 36n and 38n. The pointed ends of the strips have single oblique edges 66n angularly disposed to slits 14. The pointed ends are defined by serrations formed along both lateral elges of sheet 12n. Webs 14' hold the strips together. A rigid or flexible marginal extension 47n is provided at upper edge of holder 25n. This extension may have holes 45 for engagement in rings or posts of a binder. The extension can be located at a lateral edge of the holder instead of at the top as shown. Guide lines 27 on the back piece 26n indicate where the strips 16n are to be located for proper engagement with abutments 50. It is possible to provide side pieces for engaging sheets, parts of sheets, or strips on both sides of a sheet holder. This is indicated in FIG. 21 where side pieces such as side pieces 38n' underlay back piece 26 at both marginal lateral edges thereof, and are secured in position by border seams, and by further dots or spots 50' spaced apart lengthwise of the holder like spots 50.

In assembly 10P of FIGS. 22 and 23 is shown another plastic sheet holder 25p arranged to receive a sheet 12b such as shown in FIG. 6. Holder 25p is arranged like holder 25n except that side pieces 36p and 38p are secured to back piece 26 by short, spaced, heat-sealed bars 54. These bars define spaced abutments which engage notches 22b at the ends of strips 16b. Guide lines 27 on back piece 26b show where the strips 16b are to be located. Rigid or flexible marginal extension 47p serves for mounting the assembly in a binder or other support.

FIG. 24 shows an alternate way of scoring a program form sheet. Sheet 12r has parallel slits 14r extending only part way through the sheet to leave very thin webs 14'' joining the strips 16r. The slits may also have discontinuities or webs 14' as in sheet 12 of FIGS. 1, 2, 3 and 3A. The webs 14' and 14'' cooperate in holding the strips together. However they can very easily be torn apart to separate the several strips 16r when required.

FIG. 25 shows porgram sheets 12s formed as a laminated structure. The plural bonded layers 60, 61 and 62 have different characteristics to serve different functions. Thus uppermost layer 60 may have a good surface for writing. Center layer 61 may provide body or bulk to the sheet while bottom layer 62 may also have a good writing surface, or have a particular color, or other desirable characteristics. Slits 14s extend only part way through the laminated structure to define strips 16s. Webs 14s' and 14s'' cooperate in holding the strips together.

Program form sheet 12t shown in FIG. 26 is constructed like sheet 12s with a plurality of bonded layers 60–62. The slits 14t which define strips 16t are cut all the way through the three layers. Webs 14t' hold the strips together.

Program sheet 12w shown in FIGS. 27 and 28 is adapted for mounting in any of holders 25d, 25n or 25p. This sheet has a laminated structure with a flexible backing 64 on which are separably bonded strips 16w defined by slits 14w. The strips can easily be peeled off the flexible backing when required by tearing the separable joints 65. The sheet has serrated opposite edges 66 defining points 22w which will engage with notches 34d of holder 25d or with abutment spots or bars 50, 54 of holders 25n, 25p. The entire form sheet 12w with backing 64 will fit into the holder, but any one or more strips 16w can easily be peeled off and replaced with another in the holder.

Program form sheet 12x shown in FIG. 29 is constructed like sheet 12w except that the strips 16x are laminated with a plurality of bonded layers 70, 71, and 72 having different characteristics, such as color, flexibility, etc. The removable strips are defined by slits 14x extending through to the flexible backing 64'.

Program sheet 12y shown in FIG. 30 also has a backing 64" on which are removable strips 16y defined by slits 14y. Although the strips are effectively held to the backing by the separable bonding 65', they can also be held by tearable webs 14y' formed by discontinuities in the slits 14y as in slits 14 of FIG. 1.

The program form sheets and holders shown in FIGS. 1–30 and described above are only illustrative of ways in which the invention can be applied. It will be understood that different materials may be used than those specifically mentioned, the sheets, holders and parts thereof may have different shapes than those illustrated, and construction can be varied for different purposes. As example: parts can be made rigid or flexible; parts can be added or omitted; parts can be made up in different colors; ends of strips may have different shapes; strips may be separable by perforations; more or less than three layers can be used in laminated sheets; points, notches, keys, serrations and abutments may be used in any mating combination; side pieces engaging sheets, parts of sheets and strips can be provided at opposite sides of the back pieces in all the forms of holders described and illustrated; extension can be provided at opposite lateral edges of sides or at top and bottom edges of sheet holders, with mounting holes, or with means for engaging rods to mount in racks as indicated in FIGS. 20 and 21; sheets and strips shown in the drawings can be mounted in holders such as shown in FIGS. 20 and 22 for engagement of ends of the strips by abutment dots or bars; and other changes can be made as may occur to those skilled in the art.

While the invention has been explained with particular reference to use as a programming aid in computer work, it will be apparent that the invention is adaptable for use in making up aids for preparing: telephone and other types of directories; customer indices and indices of other types; registers of subscribers to periodicals and other types of registers; and many types of listings of items, data, names, addresses, and the like, which may require quick, convenient changes by addition, deletion, alteration or rearrangement of entries.

What is claimed is:

1. A device for aiding preparation of lists, comprising a sheet and holder, said sheet having a multiplicity of narrow markable flexible strips for inscription of data thereon, said strips extending transversely across the sheet between opposite lateral edges thereof, said strips being integrally joined together by tearable spaced webs defined by parallel closely spaced slits between the strips to facilitate tearing off individual strips from the sheet, opposite lateral edges of the sheet being formed with first serrations located at opposite ends of the strips for detachably engaging the holder; said holder comprising a generally rectangular flat back board, first flat side pieces on one side of the board at opposite lateral margins thereof, said side pieces extending longitudinally of the back board, said side pieces having inner marginal edge portions formed with other serrations to detachably engage said first serrations at opposite ends of the strips to hold the same in coplanar, parallel disposition on and transversely across the back board, and to prevent the strips from moving longitudinally of the back board, and second flat side pieces overlaying the first side pieces respectively and secured in place thereat, said second side pieces having free inner opposing marginal portions extending inwardly beyond the serrated edges of the first side pieces to prevent disengagement of the strips from the serrated edges of the first flat side pieces when the strips are in flat, unflexed condition, whereby any selected strips can be removed from the holder without disturbing other strips by flexing the selected strips to disengage opposite ends of the selected strips from inner edges of the first and second side pieces on the back board, and whereby other flexible flat strips with serrated ends can be placed on the back board and can be detachably engaged with the first side pieces under the second side pieces in place of any removed strips.

2. A device as defined by claim 1, wherein the serrated marginal edges of the first side pieces and the serrations of the lateral marginal edges of said sheet are formed as dovetail keys and notches to interlock with each other.

3. A device as defined by claim 1, wherein the back board has at least one marginal extension adapted for mounting the holder on a support, said marginal extension having a transverse score line to permit the holder to bend at the score line for partially raising the back board to expose another sheet and holder on said support.

4. A device as defined by claim 1, wherein the serrations at the opposite edges of the sheet are nonsymmetrical with respect to central transverse lines of said strips to prevent incorrect orientation and engagement of the strips with the side pieces of the holder.

References Cited

UNITED STATES PATENTS

| | | | |
|---|---|---|---|
| 752,864 | 2/1904 | Sammons | 40—64 |
| 796,600 | 8/1905 | McLane et al. | 40—64UX |
| 863,295 | 8/1907 | Leuthessen | 40—63 |
| 1,462,822 | 7/1923 | Rand | 40—64 |
| 1,488,897 | 4/1924 | Wood | 40—64 |
| 1,695,328 | 12/1928 | Gordon et al. | 40—64X |
| 1,850,935 | 3/1932 | Kilpatrick | 40—64X |
| 1,971,996 | 8/1934 | Tete | 40—64 |
| 2,246,570 | 6/1941 | Butterbaugh | 281—5 |
| 2,828,560 | 4/1958 | Hampel | 40—64X |
| 2,964,042 | 12/1960 | Hawley | 40—63X |
| 3,496,663 | 2/1970 | Scott | 40—63 |

ROBERT W. MICHELL, Primary Examiner

R. CARTER, Assistant Examiner